US005219939A

United States Patent [19]

Wamprecht et al.

[11] Patent Number: 5,219,939
[45] Date of Patent: Jun. 15, 1993

[54] POWDER COATING COMPOSITIONS

[75] Inventors: Christian Wamprecht, Neuss; Hans-Joachim Kreuder, Toenis/vorst, both of Fed. Rep. of Germany

[73] Assignee: Bayer Aktiengesellschaft, Leverkusen, Fed. Rep. of Germany

[21] Appl. No.: 748,300

[22] Filed: Aug. 21, 1991

[30] Foreign Application Priority Data

Aug. 29, 1990 [DE] Fed. Rep. of Germany ....... 4027281

[51] Int. Cl.$^5$ .................. C08F 8/00; C08L 63/00
[52] U.S. Cl. ................... 525/117; 525/113; 525/116; 525/118; 525/530; 525/533; 525/934; 525/438
[58] Field of Search ............ 525/117, 934, 530, 533, 525/113, 116, 118, 438

[56] References Cited

U.S. PATENT DOCUMENTS

| | | | |
|---|---|---|---|
| 3,991,132 | 11/1976 | Siwiec et al. | 260/836 |
| 3,991,133 | 11/1976 | Siwiec et al. | 280/836 |
| 4,211,691 | 7/1980 | Fitzgerald et al. | 260/42.21 |
| 4,816,500 | 3/1989 | Corcoran | 525/117 |
| 5,055,524 | 11/1991 | Pettit et al. | 525/934 |
| 5,057,555 | 11/1991 | White et al. | 525/117 |

FOREIGN PATENT DOCUMENTS 445639 9/1991 European Pat. Off. .
1391863 4/1975 United Kingdom .

OTHER PUBLICATIONS

Chemical Abstract 88(12): 75 374a.
Chemical Abstract 82(24): 157 882e.

Primary Examiner—Melvyn I. Marquis
Assistant Examiner—Randy Gulakowski
Attorney, Agent, or Firm—Joseph C. Gil; Thomas W. Roy

[57] ABSTRACT

The present invention relates to powder coating compositions which are solid below 30° C. and contain a mixture of A) a copolymer component which is solid below 30° C. and contains at least one copolymer containing both cyclic carboxylic anhydride groups and hydroxyl groups, B) a polyepoxide component which contains at least one polyepoxide containing at least two epoxide groups per molecule.

18 Claims, No Drawings

POWDER COATING COMPOSITIONS

BACKGROUND OF THE INVENTION

1. Field of the Invention

The present invention relates to new powder coating compositions, wherein the binder is based on a mixture of copolymers containing hydroxyl and carboxylic anhydride groups with polyepoxide compounds.

2. Description of the Prior Art

The use of compositions containing polyacrylates having at least two carboxyl groups per molecule and polyepoxide compounds, which may be based on acrylates, is known.

Japanese patent application 73-29 319 (publication number: 49 116 134; C. A. 82(24): 157 882 e) describes heat-curing coating powders containing A) a solid acrylate resin prepared by reacting a hydroxyl-functional copolymer with a polycarboxylic acid or anhydride and B) an epoxy-functional copolymer. The two polymers are mixed in the form of hot melts (100° C.) and, after cooling, the resulting mixture is ground. The coatings are applied to metal surfaces and cured at temperatures of about 200° C.

DE-OS 2,347,680 describes heat-curing powder coatings containing A) 50 to 97% of an epoxy-functional copolymer having a molecular weight of 3,000 to 15,000 and a softening point of 80° to 150° C. and B) 3 to 50% of a carboxyl-functional curing agent having a softening point of at least 50° C.; the curing agent may also be a carboxyl-functional copolymer.

Japanese patent application 75-146 705 (publication number: 52 069 936; C.A. 88(12): 75 374 a) describes heat-curing powder coatings based on glycidyl (meth)acrylate o copolymers containing A) 100 parts of a copolymer (Tg 30 to 100° C., molecular weight 3,000 to 70,000) containing 10 to 50% by weight glycidyl (meth)acrylate, 30 to 85% by weight $C_{1-12}$ alkyl acrylate and 0 to 60% by weight of another comonomer, B) 0.1 to 30 parts of a flow-regulating copolymer (Tg > 50° C., molecular weight > 1,000) containing 30 to 85% by weight of an alkyl (meth)acrylate, 1 to 50% by weight of a monomer containing a glycidyl, carboxyl, hydroxyl or amide group and 0 to 69% by weight of another monomer and C) 3 to 55 parts of an aliphatic dicarboxylic acid containing 4 to 20 carbon atoms. The paints show good adhesion to metals without preliminary surface treatment.

U.S. Pat. Nos. 3,991,132 and 3,991,133 describe heat-curing coating powders containing A) an epoxy-functional copolymer prepared from of 5 to 20% glycidyl methacrylate and 80 to 95% of other comonomers (Tg 40° to 90° C., molecular weight 1,500 to 15,000) and B) an anhydride crosslinking agent which is either a dicarboxylic anhydride or a dicarboxylic anhydride homopolymer, provided that the copolymer is difunctional. In addition to 70 to 93% of other comonomers such as methyl or butyl methacrylate, styrene and vinyl toluene, U.S. Pat. No. 3,991,132 discloses that the anhydride crosslinking agent is prepared from at least 2 to 10% of an unsaturated acid amide, while U.S. Pat. No. 3,991,133 discloses that the anhydride crosslinking agent is prepared from at least 2 to 10% of a $C_{5-7}$ hydroxyalkyl (meth)acrylate. Further, the anhydride curing agent is replaced by a hydroxycarboxylic acid in such a quantity that, for every functional group of the copolymer, there are 0.1 to 0.4 carboxyl groups of the hydroxycarboxylic acid.

It has now surprisingly been found that copolymers of olefinically unsaturated compounds containing both incorporated hydroxyl groups and incorporated intramolecular carboxylic anhydride groups in the same molecule, in combination with polyepoxides, represent excellent binders for powder coatings, provided that they possess the necessary softening point or softening range. The particular advantage of such systems is that component A) initially contains no free carboxyl groups which are necessary for crosslinking with the epoxide groups of component B). Instead these carboxyl groups are only formed from the reaction of the carboxylic anhydride groups with hydroxyl groups by the action of heat. Accordingly, these binder composition show considerably better storage stability at room temperature than comparable prior art systems which contain free carboxyl groups. Another advantage of the binder compositions according to the invention is that the hardening reaction is based on a so-called "double-cure" mechanism, i.e., the hydroxyl groups of component A) initially react with the anhydride groups of component A) under the effect of heat or catalysts with opening of the anhydride ring and formation of carboxyl groups. This reaction is itself a crosslinking reaction. In addition, the newly formed carboxyl groups can react with the epoxide groups of component B) which results in additional crosslinking.

By virtue of the high crosslink densities which may be obtained, coatings characterized by very high resistance to chemicals and solvents are obtained from the binder compositions according to the invention.

Accordingly, the binder combinations according to the invention show excellent stability in storage at room temperature or moderately elevated temperatures below their softening range and, on the other hand, provide for the production of coatings having excellent performance properties.

SUMMARY OF THE INVENTION

The present invention relates to powder coating compositions which are solid below 30° C. and contain A) a copolymer component which is solid below 30° C. and contains at least one copolymer containing both cyclic carboxylic anhydride groups and hydroxyl groups, B) a polyepoxide component which contains at least one polyepoxide containing at least two epoxide groups per molecule.

DETAILED DESCRIPTION OF THE INVENTION

Preferably the powder coating compositions according to the present invention are solid powders below 30° C. and contain A) 20 to 99 parts by weight of a copolymer component which is solid below 30° C. and contains at least one copolymer which has a weight average molecular weight of 1,500 to 75,000, is prepared from olefinically unsaturated compounds and contains
  i) 0.1 to 6.0% by weight of free hydroxyl groups and
  ii) 1 to 30% by weight of carboxylic anhydride groups (calculated as $C_4H_2O_3$) in chemically bound form and B) 1 to 80 parts by weight of an epoxide component which contains at least one organic polyepoxide containing at least two epoxide groups per molecule, provided that, for every anhydride group of component A) there are 0.2 to 8 epoxide groups of component B). Preferably the parts by weight of components A) and B) add up to 100, based on the weight of components A) and B).

The powder coating compositions according to the invention may comprise component A) in powder-form as well as component B) in powder-form, i.e each particle consisting either of component A) or of component B). Preferably the powder coating compositions comprise "mixed powders AB" i.e. powders in which each powder particle comprises component A) as well as component B). Such "mixed powders AB" are obtained if the coatings are manufactured in extruder or kneaders as explained in detail hereinafter.

Although applicants' earlier German Patent application P 39 20 413.8 is concerned with compositions containing A) copolymers having both free hydroxyl groups and intramolecular carboxylic anhydride groups in chemically incorporated form and B) polyepoxides, the binder compositions according to the earlier application are used solely as binders for solvent-based paints. There is no teaching or suggestion in the application as to the suitability of such compositions or similar compositions as binders for powder coatings.

Copolymer component A) contains at least one copolymer having both chemically incorporated free hydroxyl groups in a quantity of 0.1 to 6.0% by weight, preferably 0.2 to 4.0% by weight, and chemically incorporated intramolecular cyclic carboxylic anhydride groups corresponding to the formulas

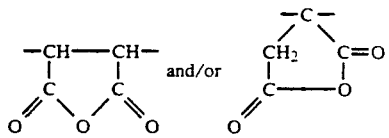

in a quantity of 1 to 30% by weight, preferably 5 to 25% by weight. The copolymers have a weight average molecular weight ($M_w$, as determined by gel permeation chromatography using polystyrene as standard) of 1,500 to 75,000, preferably 2,000 to 60,000 and more preferably 3,000 to 40,000. The copolymers are preferably based on monoolefinically unsaturated monomers.

Three groups of olefinically unsaturated monomers are used for the preparation of the copolymers, i.e., a) olefinically unsaturated monomers containing hydroxyl groups,
b) olefinically unsaturated monomers containing intramolecular anhydride groups and
c) non-functional, olefinically unsaturated monomers free from hydroxyl and anhydride groups.

Monomers a) are used in a amount of 0.5 to 50 parts by weight, preferably 5 to 40 parts by weight; monomers b) are used in an amount of 1 to 30 parts by weight, preferably 5 to 25 parts by weight; and monomers c) are used in a quantity of 20 to 98.5 parts by weight, preferably 35 to 90 parts by weight, wherein the parts by weight of monomers a), b) and c) preferably adds up to 100. Another factor to be taken into consideration is that the percentages of the individual monomers in the mixture to be copolymerized are selected such that the above-mentioned amounts of chemically incorporated hydroxyl and anhydride groups are present in the copolymers. The content of these groups in the copolymers corresponds to the content of these groups in the monomer mixture because it may be assumed that the chemical composition of the copolymers corresponds to the chemical composition of the monomer mixture.

The monomers a) are monoolefinically unsaturated alcohols which preferably have a molecular weight of 58 to 500 and preferably have aliphatically bound hydroxyl groups. Suitable monomers include hydroxyalkyl esters of acrylic and methacrylic acid such as hydroxyethyl (meth)acrylate [(meth)acrylate refers to both acrylate and methacrylate groups], hydroxypropyl (meth)acrylate and 4-hydroxybutyl (meth)acrylate; hydroxyalkyl vinyl ethers such as hydroxyethyl vinyl ether and hydroxybutyl vinyl ether; allyl alcohol; hydroxy derivatives of (meth)acrylamide such as N-(3-hydroxy-2,2-dimethylpropyl)-(meth)acrylamide; reaction products of glycidyl (meth)acrylate with monocarboxylic acids; reaction products of (meth)acrylic acid with monoepoxide compounds; and reaction products of the previously mentioned OH-functional, olefinically unsaturated compounds with δ-caprolactone or butyrolactone.

Suitable examples of monomers b) include itaconic anhydride or maleic anhydride; maleic anhydride is preferred.

Monomers c) have a molecular weight of 86 to 400 and include those which are used as monomers in the previously described prior art processes. Monomers c) are preferably monoolefinically unsaturated monomers which are free from hydroxyl and anhydride groups.

Examples include esters of acrylic and methacrylic acid such as methyl acrylate, ethyl acrylate, n-butyl acrylate, isobutyl acrylate, tert. butyl acrylate, 2-ethylhexyl acrylate, cyclohexyl methacrylate, methyl methacrylate, n-butyl methacrylate, isobutyl methacrylate and 2-ethylhexyl methacrylate; aromatic vinyl compounds such as styrene, vinyl toluene, α-methyl styrene, α-ethyl styrene and nucleus-substituted diethyl styrenes, isopropyl styrenes, butyl styrenes and methoxystyrenes which may optionally be present as isomer mixtures; vinyl ethers such as ethyl vinyl ether, n-propyl vinyl ether, isopropyl vinyl ether, n-butyl vinyl ether and isobutyl vinyl ether; and vinyl esters such as vinyl acetate, vinyl propionate and vinyl butyrate.

Mixtures of the monomers a) to c) mentioned by way of example may of course be used to carry out the copolymerization reaction, provided that the monomers used in the preparation of the copolymers are selected so that the resulting copolymers are solid below 30° C., preferably below 40° C., and are liquids at temperatures above 150° C., preferably above 120° C. In other words, the copolymers must have a softening point or softening range, as determined by differential thermoanalysis (DTA), of 30° to 150° C., preferably 40° to 120° C. This requirement, which is crucial to the suitability of the copolymers for use in accordance with the invention, is satisfied when a suitable ratio of "softening" monomers to "hardening" monomers is used in the preparation of the copolymers. The "softening" monomers lead to a reduction in the softening temperature of the copolymers, while the "hardening" monomers lead to an increase in the softening temperature of the copolymers.

"Softening" monomers include alkyl esters of acrylic acid methyl acrylate, ethyl acrylate, butyl acrylate, isobutyl acrylate, 2-ethylhexyl acrylate, lauryl acrylate and ethyl diglycol acrylate; vinyl esters such as vinyl propionate; and vinyl ethers such as vinyl methyl ether, vinyl ethyl ether, vinyl propyl ether, vinyl isobutyl ether, vinyl octadecyl ether and vinyl cyclohexyl ether.

"Hardening" monomers include alkyl esters of methacrylic acid such as methyl methacrylate, ethyl methacrylate, isobutyl methacrylate, cyclohexyl methacrylate, 2-phenyl ethyl methacrylate, tetrahydrofurfuryl methacrylate, isopropyl methacrylate, tert. butyl methacrylate, neopentyl methacrylate, isobornyl methacrylate and benzyl methacrylate; aromatic vinyl compounds such as styrene, vinyl toluene, α-methyl styrene and α-ethyl styrene; and heterocyclic vinyl compounds such as vinyl pyrrolidone, vinyl caprolactam and vinyl carbazole.

The copolymers may be prepared by the copolymerization of monomers a) to c) using standard radical polymerization processes such as bulk or solution polymerization. In this case, the monomers are copolymerized at temperatures of 60° to 140° C., preferably 80° to 120° C. in the presence of radical formers and, optionally, molecular weight regulators.

The preparation of the copolymers is preferably carried out in inert solvents. Suitable solvents include aromatic hydrocarbons such as benzene, toluene and xylene; esters such as ethyl acetate, butyl acetate, hexyl acetate, heptyl acetate, methyl glycol acetate, ethyl glycol acetate and methoxypropyl acetate; ethers such as tetrahydrofuran, dioxane and diethylene glycol dimethyl ether; ketones such as acetone, methylethyl ketone, methyl isobutyl ketone, methyl n-amyl ketone and methyl isoamyl ketone; and mixtures of such solvents.

The preparation of the copolymers may be continuous or discontinuous. Normally, the monomer mixture is introduced uniformly and continuously into a polymerization reactor, the initiator is added and, at the same time, the corresponding quantity of polymer is continuously removed. Substantially chemically uniform copolymers may advantageously be produced in this way. Substantially chemically uniform copolymers may also be obtained by adding the reaction mixture to a stirred tank reactor at a constant rate without removing the polymer.

It is also possible initially to introduce part of the monomers, for example in the previously described solvents, and to subsequently add the remaining monomers and auxiliaries separately or together at the reaction temperature.

In general, the polymerization takes place under atmospheric pressure, although it may also be carried out at pressures of up to 20 bar.

The initiators are used in quantities of 0.05 to 15% by weight, based on the total quantity of monomers. Suitable initiators are known and include aliphatic azo compounds such as azodiisobutyronitrile, azo-bis-2-methylvaleronitrile, 1,1'-azo-bis-1-cyclohexane nitrile and 2,2'-azo-bis-isobutyric acid alkyl ester; symmetrical diacyl peroxides such as acetyl, propionyl and butyryl peroxide, bromine-, nitro-, methyl- or methoxy-substituted benzoyl peroxides and lauryl peroxides; symmetrical peroxydicarbonates such as diethyl, diisopropyl, dicyclohexyl and dibenzoyl peroxydicarbonate; tert. butyl peroxy-2-ethyl hexanoate; tert. butyl perbenzoate; hydroperoxides such as tert. butyl hydroperoxide and cumene hydroperoxide; and dialkyl peroxides such as dicumyl peroxide, tert. butyl cumyl peroxide and di-tert. butyl peroxide.

To regulate the molecular weight of the copolymers, typical regulators may be used during their preparation. Examples of suitable molecular weight regulators are tert. dodecyl mercaptan, n-dodecyl mercaptan and diisopropyl xanthogene disulfide. The regulators may be used in quantities of 0.1 to 10% by weight, based on the total quantity of monomers.

The solutions of the copolymers which are obtained during the copolymerization may be subjected without further working up to the evaporation or degassing process in which the solvent is removed, for example in an evaporation extruder at approximately 120° to 160° C. under a vacuum of 100 to 300 mbar. The copolymers to be used in accordance with the invention are obtained.

Component B) contains at least one organic compound having at least two epoxide groups per molecule and a glass transition temperature (DTA) of from 0° to 150° C., preferably of from 30° to 150° C. and most preferably of from 40° to 120° C. Components B) which have a glass transition temperature of below 30° C. resp. a melting point of below 30° C. or which are even liquid at room temperature may be used in combination with components A) having a relatively high glass transistion temperature resp. melting point within the range disclosed hereinbefore, provided the preferred method for preparing the powder coating compositions in kneaders or extruders is used in which case the combinations are solids above 30° C. even if such component B) was used. The preferred compounds of component B) include those which (on a statistical average) contain 2 to 50, preferably 2 to 10 epoxide groups per molecule.

Examples of suitable and preferred polyepoxides include those based on bisphenol A and marketed, for example, by Shell under the names Epikote 1001 (epoxide group content approx. 2 moles/kg), Epikote 1002 (epoxide group content approx. 1.5 moles/kg), Epikote 1055 (epoxide group content approx. 1.2 moles/kg), Epikote 1007 (epoxide group content approx. 0.55 moles/kg) and Epikote 3003 (epoxide group content approx. 1.3 moles/kg). Also suitable are glycidyl ethers of heterocyclic compounds such as triglycidyl isocyanurate or triglycidyl urazole; glycidyl esters of dicarboxylic acids such as diglycidyl terephthalate; epoxide-functional copolymers having a glass transition temperature of $\geq 30°$ C. prepared, for example, by the co-use of glycidyl (meth)acrylate as comonomer. Triglycidyl isocyanurate, terephthalic acid diglycidyl esters and glycidyl ethers based on bisphenol A are preferably used as the polyepoxide component B).

Component C) which is optional present in the powder coating compositions according to the invention, is selected from the auxiliaries and additives known per se in powder coating technology. These auxiliaries and additives include pigments such as titanium dioxide and flow control agents such as the silicone compounds typically used for this purpose.

Although the powder coating compositions may be stoved without accelerators, catalysts may be added which accelerate either or both the reaction between the hydroxyl and carboxylic anhydride groups and the epoxide and carboxylic acid groups. These catalysts reduce the stoving time and/or the stoving temperature.

Suitable catalysts include compounds containing tertiary amino groups such as 1,4-diazabicyclo[2.2.2])octane, 1,8-diazabicyclo[5.4.0]undec-7-ene, 1,5-diazabicyclo[4.3.0]non-5-ene, 1,2-dimorpholinoethane and 1,3,5-tri-cyclohexyhydro-1,3,5-triazine; salts based on compounds containing tertiary amino groups and quaternary ammonium groups such as (2-hydroxyethyl)-trimethyl ammonium chloride, triethylamine hydrochloride, tetrabutyl ammonium chloride, tetraethyl ammonium bromide, tetrahexyl ammonium chloride and tetramethyl ammonium chloride; organotin compounds such as tin dioctoate, dibutyl tin dilaurate, dibutyl tin diacetate and dibutyl tin dichloride; and phosphorus compounds such as triphenyl phosphine.

To prepare the ready-to-use coating powders, the solventless copolymers A), polyepoxide compounds B) and optional additives C) are preferably homogenized in the melt in extruders or kneaders, preferably at temperatures 100° to 120° C. After the mixture has solidified, the solid is ground and freed by sieving from particles larger than the required size, for example, above 0.1 mm. The coating powders may, of course, also be prepared by mixing powder of A),B) and optionally C) previously prepared in a separate process.

The amounts in which components A) and B) are used are generally selected so that for every anhydride group of component A) there are 0.2 to 4, preferably 0.5 to 2 hydroxyl groups of component A) and 0.2 to 8, preferably 0.4 to 4 and more preferably 0.8 to 1.5 epoxide groups of component B).

The powder coating compositions according to the invention may be applied to heat-resistant substrates by standard powder application processes such as electrostatic powder spraying or fluidized bed coating. The coatings may be hardened by heating to temperatures of 130° to 220° C., preferably 150° to 200° C. Hard, glossy or matt, solvent-resistant coatings are obtained which combine excellent corrosion-inhibiting properties with high color stability under heat. According to the invention, it is possible to coat any heat-resistant substrates, for example, glass or metal substrates.

In the following examples, all percentages are by weight, unless otherwise stated.

EXAMPLES

I. General procedure for the preparation of hydroxyl- and anhydride-functional copolymers $A_1$ to $A_4$ Part I was initially introduced into a 25 liter pressure reactor of stainless steel equipped with a stirrer and with a heating and cooling system and heated to the reaction temperature. Part II and part III were then added at the same time over total periods of 3 hours and 3.5 hours, respectively. The mixture was then stirred for 1 hour at the indicated temperature.

The polymer solutions obtained were completely freed from the solvent in a commercially available evaporation extruder over a period of about 2 minutes at a temperature of approximately 150° C. and under a vacuum of approximately 260 mbar, subsequently cooled and granulated.

The reaction temperatures and the composition of parts I to III are shown in Table I together with the characteristic data of the copolymers obtained.

TABLE I

| Copolymers | (quantities in g) | | | |
|---|---|---|---|---|
| | $A_1$ | $A_2$ | $A_3$ | $A_4$ |
| Part I | | | | |
| Toluene | 8000 | 8000 | 8000 | 8000 |
| Part II | | | | |
| Methyl methacrylate | 4290 | 3718 | 4592 | 3118 |
| Butyl methacrylate | 2688 | — | 3024 | — |
| 2-Ethylhexyl methacrylate | — | 3136 | — | — |
| Butyl acrylate | — | — | — | 3764 |
| Styrene | 1742 | 1680 | 1344 | 1612 |
| Hydroxyethyl methacrylate | 1162 | 1266 | 1064 | 1290 |
| Maleic anhydride | 870 | 952 | 728 | 968 |
| Part III | | | | |

TABLE I-continued

| Copolymers | (quantities in g) | | | |
|---|---|---|---|---|
| | $A_1$ | $A_2$ | $A_3$ | $A_4$ |
| Tert. butyl peroxy-2-ethylhexanoate (70% in iso-dodecane) | 640 608 | 640 608 | 640 608 | 640 608 |
| Polymerization temperature (°C.) | 110 | 110 | 110 | 110 |
| Temperature of the after-stirring phase (°C.) | 90 | 90 | 90 | 90 |
| Solids content | 55.2 | 55.4 | 55.5 | 55.6 |
| Viscosity (23° C., mPa.s) | 15670 | 18490 | 21340 | 3766 |
| Softening point of the solid resin (DTA, °C.) | 71.6 | 60.4 | 53.5 | 40.8 |

II. Production of powder coating compositions according to the invention

Copolymers $A_1$ to $A_4$ were melted and homogenized in an extruder with polyepoxide B) and, optionally, other auxiliaries and additives C). After the discharged melt had solidified, the product was ground, freed from particles larger than 0.1 mm in size by sieving, applied to metal test plates by electrostatic spraying and then hardened for 15 minutes at 180° C.

The solvent resistance of the approximately 55 μm thick coating films was tested by a rubbing test using a cotton wool plug soaked in acetone. The result of this test is expressed as the number of double rubs which the paint film was able to withstand without visibly changing. No film was subjected to more than 50 double rubs.

The particular formulations in % by weight and the solvent resistance as an indication of the degree of crosslinking are shown in Table II.

TABLE II

Formulations of the powder coating compositions according to the invention, quantities in % by weight

| Formulation1 | 1 | 2 | 3 | 4 | 5 | 6 | 7 |
|---|---|---|---|---|---|---|---|
| Copolymer | 55.7 | 54.1 | 55.2 | 37.3 | 57.6 | 51.2 | 51.1 |
| | $A_1$ | $A_1$ | $A_2$ | $A_2$ | $A_2$ | $A_3$ | $A_4$ |
| TGIC[1] | 4.3 | — | 4.8 | — | 2.4 | 8.8 | 8.9 |
| DGT[2] | — | 5.9 | — | — | — | — | — |
| Epoxide[3] | — | — | — | 22.7 | — | — | — |
| Titanium dioxide | 40.0 | 40.0 | 40.0 | 40.0 | 40.0 | 40.0 | 40.0 |
| Acetone rubbing test (number of double rubs) | 50 | 45 | 50 | 30 | 50 | 50 | 45 |

[1]Triglycidyl isocyanurate
[2]Diglycidyl terephthalate
[3]Epikote 1001, available from Shell Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition which is solid below 30° C. and comprises
   A) a copolymer component which is solid below 30° C. and comprises at least one copolymer having both cyclic carboxylic anhydride and hydroxyl groups and
   B) a polyepoxide component which comprises at least one polyepoxide having at least two epoxide groups per molecule.

2. The powder coating composition of claim 1 wherein component A) is present in an amount of 20 to 99 parts by weight and comprises at least one copolymer which has a weight average molecular weight of 1,500 to 75,000, is prepared from olefinically unsaturated compounds and contains i) 0.1 to 6.0% by weight of free hydroxyl groups and ii) 1 to 30% by weight of carboxylic anhydride groups (expressed as $C_4H_2O_3$) in chemically bound form and component B) is present in an amount of 1 to 80 parts by weight, provided that for every anhydride group of component A) there are 0.2 to 8 epoxide groups of component B).

3. The powder coating composition of claim 1 wherein component A) comprises a copolymer obtained by the radical-initiated copolymerization of a) 0.5 to 50 parts by weight of olefinically unsaturated monomers containing hydroxyl groups, b) 1 to 30 parts by weight of olefinically unsaturated monomers containing anhydride groups and c) 20 to 98.5 parts by weight non-functional olefinically unsaturated monomers which are free from hydroxyl and anhydride groups.

4. The powder coating composition of claim 2 wherein component A) comprises a copolymer obtained by the radical-initiated copolymerization of a) 0.5 to 50 parts by weight of olefinically unsaturated monomers containing hydroxyl groups, b) 1 to 30 parts by weight of olefinically unsaturated monomers containing anhydride groups and c) 20 to 98.5 parts by weight non-functional olefinically unsaturated monomers which are free from hydroxyl and anhydride groups.

5. The powder coating composition of claim 3 wherein monomer b) comprises maleic anhydride and/or itaconic anhydride.

6. The powder coating composition of claim 4 wherein monomer b) comprises maleic anhydride and/or itaconic anhydride.

7. The powder coating composition of claim 3 wherein monomer a) comprises a hydroxyalkyl ester of acrylic and/or methacrylic acid.

8. The powder coating composition of claim 4 wherein monomer a) comprises a hydroxyalkyl ester of acrylic and/or methacrylic acid.

9. The powder coating composition of claim 5 wherein monomer a) comprises a hydroxyalkyl ester of acrylic and/or methacrylic acid.

10. The powder coating composition of claim 6 wherein monomer a) comprises a hydroxyalkyl ester of acrylic and/or methacrylic acid.

11. The powder coating composition of claim 1 wherein component B) comprises triglycidyl isocyanurate and/or terephthalic acid diglycidyl ester.

12. The powder coating composition of claim 2 wherein component B) comprises triglycidyl isocyanurate and/or terephthalic acid diglycidyl ester.

13. The powder coating composition of claim 4 wherein component B) comprises triglycidyl isocyanurate and/or terephthalic acid diglycidyl ester.

14. The powder coating composition of claim 10 wherein component B) comprises triglycidyl isocyanurate and/or terephthalic acid diglycidyl ester.

15. The powder coating composition of claim 1 wherein component B) comprises a glycidyl ether based on bisphenol A or an epoxy-functional copolymers.

16. The powder coating composition of claim 2 wherein component B) comprises a glycidyl ether based on bisphenol A or an epoxy-functional copolymers.

17. The powder coating composition of claim 4 wherein component B) comprises a glycidyl ether based on bisphenol A or an epoxy-functional copolymers.

18. The powder coating composition of claim 10 wherein component B) comprises a glycidyl ether based on bisphenol A or an epoxy-functional copolymers.

* * * * *